H. MARTIN.
LUBRICATING DEVICE.
APPLICATION FILED JAN. 2, 1913.

1,078,449.

Patented Nov. 11, 1913.

Witnesses:
M. E. McDade

Inventor
Heinrich Martin

UNITED STATES PATENT OFFICE.

HEINRICH MARTIN, OF LAIBACH, AUSTRIA-HUNGARY.

LUBRICATING DEVICE.

1,078,449.   Specification of Letters Patent.   Patented Nov. 11, 1913.

Application filed January 2, 1913.   Serial No. 739,744.

*To all whom it may concern:*

Be it known that I, HEINRICH MARTIN, subject of the Emperor of Austria-Hungary, residing at Laibach, Carinthia, Austria-Hungary, have invented certain new and useful Improvements in Lubricating Devices, of which the following is a specification.

The present invention relates to a lubricator of that kind in which the discharge valve is operated by the concussions of the machine itself and the said discharge valve after having been opened by the concussion is brought back again into the closing position by means of a helical spring.

The lubricator according to the present invention differs essentially from the known lubricators of this kind in that a helical spring which can oscillate quite freely is fixed at one end to the seat of the valve and is connected at its other end to an oscillating weight that is in rigid connection with the valve disk. In this arrangement of the valve the helical spring is under tensile stress, whereby a most sensitive deflection is obtained and the possibility of a most sensitive regulation is afforded.

The particular mode of suspension of the valve disk admits of an exceedingly sensitive working of the lubricator even with the slightest concussions of the machine, and owing to the adjustable arrangement of the oscillating weight a most precise regulation of the lubrication can be obtained. The greater the concussions of the machine will be the more is the extent to which the valve disk will be raised from the seat and the more will be the quantity of the lubricant discharged through the valve.

Owing to the great simplicity of the lubricating device it can be screwed in and adapted to any oil cup whatever; it can be put in operation without regard to the shape and size of the oil cup.

Figure 1:
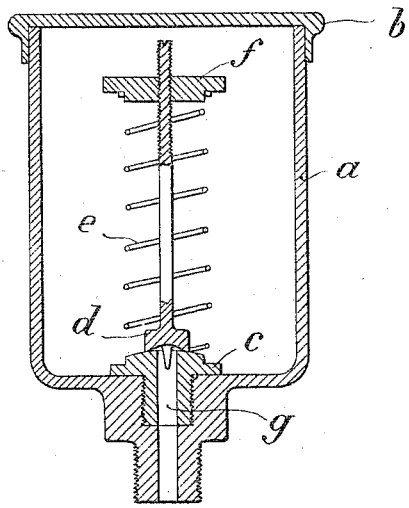
Figure 2:
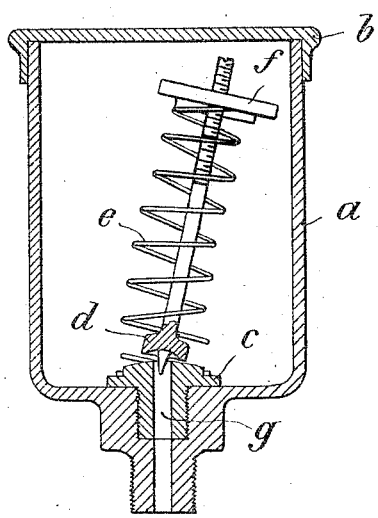

An embodiment of the invention is disclosed in the accompanying drawings, wherein:

Figure 1 is a vertical central sectional view showing a lubricator in which the features of the invention are incorporated, with the valve thereof in closed position; Fig. 2 is a similar view, but showing the valve of the lubricator in an open position.

Similar characters of reference designate corresponding parts in both of the figures.

The oil cup $a$ may have any desired shape and size and is closed by the cover $b$. In the bottom of this cup is arranged a valve seat $c$ to which is rigidly connected one end of a helical spring $e$, the opposite end of which is connected to an oscillatory weight $f$. This weight $f$ can be adjusted to any desired position along the valve spindle that carries the valve disk $d$ which latter is provided with a pin like projection for engagement in the oil-discharge duct $g$.

The lubricator operates in the following manner: When the apparatus is at rest the valve disk $d$ which is ground to accurately engage upon the seat $c$ is pulled downward by the spring $e$ and uniformly engaging the seat, closes the aperture thereof so that the lubricator is not working. As soon, however, as the machine is undergoing some concussions or some irregularities in its running the oscillatory weight $f$ which is kept in position of equilibrium only by the spring $e$ and owing to its inertia is not capable of quickly following the movement of the machine, comes into action and the spindle is forced to follow the originated swaying momentum, in consequence whereof the valve disk $d$ is partly raised from its seat $c$ and the oil duct is opened for the discharge of the lubricant. Fig. 2 represents the lubricator in this position. However, the opening of the lubricator disk and the maintenance of the same in a slanting position will last only until the spring $e$ has pulled the oscillatory weight $f$ back again into its position of equilibrium. The oil duct is then again closed. In this manner the oscillatory weight will perform a reciprocating oscillatory motion, according to the changes in the motion of the parts of the machine, and the lubricator will during these oscillations allow the discharge of a greater or smaller quantity of oil in proportion to the extent of the said oscillatory motions. Thus when the parts of the machine are submitted to a more energetic motion there will be a greater demand for lubricating material and the apparatus will consequently yield a greater amount of lubricant; when the machine is performing less energetic motions the lubricator will discharge a lesser amount of lubricating material in accordance with the diminished demand.

The valve seat $c$ is by preference made of convex shape in order to obtain a perfect closure of the valve after each return of the valve disk $d$ into its position of equilibrium.

In all other respects the valve disk $d$ may be of any desired shape.

The oscillatory weight $f$ can, as above mentioned, be adjusted along the valve spindle. This is for purpose of regulating the tension of the spring and the consequent amplitude of oscillation of the weight. To effect this adjustment it is only necessary to turn the valve spindle together with the valve disk in one or the other direction in order to obtain a raising or a lowering of the oscillatory weight that is screwed on the threaded part of the spindle and thus to produce a higher or lower pressure of the valve disk upon its seat. This circumstance in combination with a correct choice in the strength of the spring will produce a most simple but exceedingly precise regulation of the oil feed as becomes necessary in certain cases. For producing a sudden and abundant lubrication, it is only necessary to raise the valve disk from its seat and this can be performed both during the working of the machine and when it is at rest.

It is not necessary to form the valve seat $c$ as a separate part which can be unscrewed from the oil cup. The bottom of the oil cup itself can be shaped as the seat of the valve or the seat can be made out of one single piece with the cup. The pin-shaped projection which extends downward from the valve disk is intended to serve as an abutment in order to prevent the valve disk from moving sideward to such an extent that the lubricating duct can no longer be closed.

I claim—

A lubricating device comprising a cup provided with a valve seat, a valve formed to uniformly engage said seat and provided with an upright stem, a weight mounted adjacent the upper end of the stem and a helical spring having an end secured to the valve seat and an end secured to the weight and tending to seat the valve, the valve being displaced from its seat by the concussions of the machine to which the lubricating device is applied and the weight causing the displacements of said valve to be of oscillatory character and proportionate to the force of the concussions.

In testimony whereof I have hereunto set my hand in presence of two subscribing witnesses.

HEINRICH MARTIN.

Witnesses:
HANS SCHWARZ,
MAX DITTLEY.